Oct. 11, 1938.        G. L. HOCKENYOS        2,132,786
                     PROCESS OF FUMIGATION
                     Filed Dec. 19, 1934          2 Sheets-Sheet 1

INVENTOR:
GEORGE L. HOCKENYOS.
BY
ATTORNEY.

Oct. 11, 1938.  G. L. HOCKENYOS  2,132,786
PROCESS OF FUMIGATION
Filed Dec. 19, 1934    2 Sheets-Sheet 2
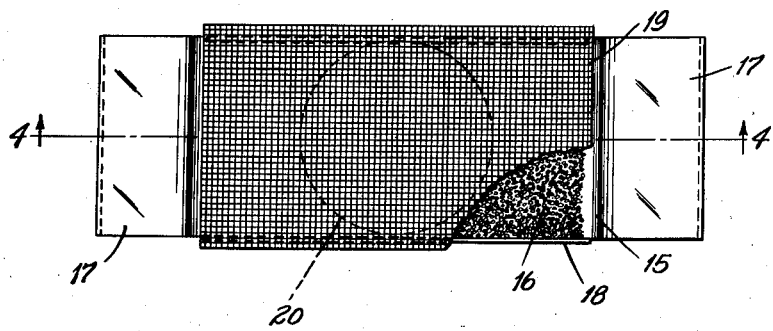
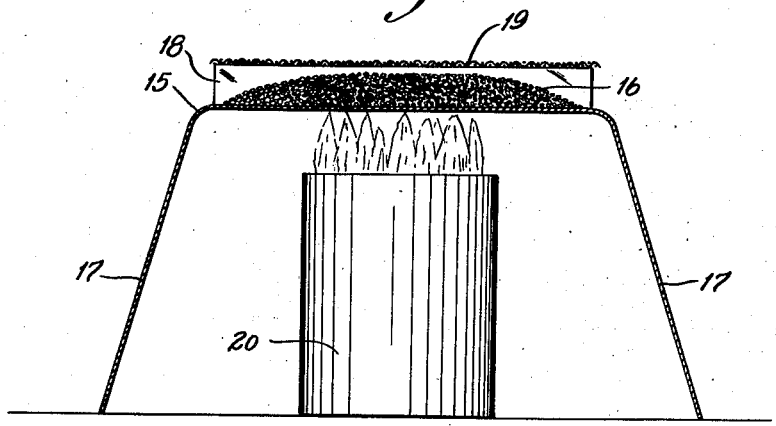
INVENTOR:
GEORGE L. HOCKENYOS.
ATTORNEY.

Patented Oct. 11, 1938

2,132,786

UNITED STATES PATENT OFFICE 2,132,786

PROCESS OF FUMIGATION

George L. Hockenyos, Springfield, Ill., assignor to Monsanto Chemical Company, St. Louis, Mo., a corporation of Delaware Application December 19, 1934, Serial No. 758,236

4 Claims. (Cl. 21—58)

This invention relates to fumigants for exterminating such insect and rodent pests as infest dwellings, storage rooms, ships and similar structures, and it has particular relation to the preparation and use of sulfur dioxide in this capacity.

The main objects of the invention are to provide:

A process of and composition for generating sulfur dioxide for fumigation purposes in which formation of deposits of solid sublimed sulfur upon the surfaces of and chemical decomposition of the articles to be fumigated is obviated;

A process of fumigation by means of sulfur dioxide in which fire hazards and similar risks are reduced to a minimum;

A process of fumigation by means of sulfur dioxide in which the expense involved in the generation of the sulfur dioxide is relatively slight;

A process of the above indicated character which is more effective in the extermination of insect and rodent pests than the conventional processes.

These and other objects will be apparent from consideration of the drawings and the specification relating thereto.

In the drawings,

Figure 3 is a plan view of a modified form of apparatus for simultaneously burning carbon bisulfide and gasifying solid carbon dioxide and showing for purposes of clarity certain elements partially broken away.

Figure 4 is a view, partially in cross-section and partially in elevation, of the embodiment of the invention shown in Figure 3.

Figure 1:
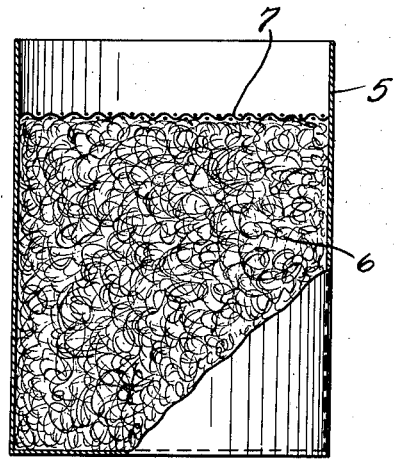
Figure 1 is a view, partly in cross-section and partly in elevation, of a container filled with a material suitable for use in the practice of the invention.

Although the use of sulfur dioxide for purposes of exterminating insect and rodent pests has been known for a period of at least two or three thousand years, the process has never proved entirely satisfactory for a plurality of reasons. For example, the conventional process of forming sulfur dioxide involved burning elemental sulfur in a closed room or chamber which was itself the object of fumigation or which contained the articles to be fumigated. In such process the sulfur tended to sublime and as a result, films of elemental sulfur were deposited upon the various exposed surfaces associated with the fumigation chamber or the articles being fumigated. A certain degree of fire hazard also attended the use of solid sulfur because large amounts were required and the burning thereof heated the containers in which it was placed to high temperatures. Furthermore, sulfur dioxide is relatively corrosive in its nature, and damage to delicate surfaces or to textile materials which were being fumigated sometimes resulted.

Because of these defects in the process of fumigation by sulfur dioxide the process in modern times has been, to a large extent, supplanted by fumigation by means of hydrocyanic acid and related cyanides. These materials are intensely toxic in their nature and relatively small amounts thereof are effective to destroy all insect and rodent life. However, their extreme toxicity and slight odor also make them highly dangerous to use because traces thereof often linger unnoticed in secluded portions of the structures or articles being fumigated and unless great caution is observed in the airing after fumigation, there is material danger of cyanide poisoning to the users of the articles or structures. It has been proposed to overcome these defects by incorporating into the cyanide gases a suitable irritant which acts as a warning when the gases have not been expelled by proper ventilation. This is only a makeshift solution of the problem, and as a result many legal restrictions have been placed upon the use of cyanides as fumigants thereby greatly hampering the use thereof and tending to increase the expenses involved therein.

This invention involves a novel process of and composition for supplying sulfur dioxide whereby the disadvantages heretofore attending the use of that composition in fumigation are largely eliminated. These advantages are attained by burning a suitable inflammable compound of sulfur, such as carbon bisulfide in the presence of carbon dioxide, rather than burning the elemental sulfur. Preferably this burning is effected by incorporating the carbon bisulfide with a porous material, such as kieselguhr or cotton batting which act as absorbents and prevent unduly rapid combustion. The combustion is best effected by incorporating the composition of carbon bisulfide and absorbent into a suitable container, for example an ordinary tin can, and effecting combustion while the material is contained therein.

A satisfactory composition for use in practice of the invention may be obtained by admixing kieselguhr or similar absorbent material with carbon bisulfide in the ratio of approximately one pound of kieselguhr for each three pounds of carbon bisulfide. The resultant material is of claylike consistency and may be readily filled into conventional tin cans for burning. If the material is to be stored for any length of time, it of course is advisable to equip the cans with lids for purposes of preventing evaporation and to eliminate fire hazards. Cans of appropriate size for use in fumigation may be filled with the material or large bulks may be stored in drums and later filled into smaller containers for use as desired. These latter may be recharged and used repeatedly.

If desired, ordinary cotton batting may likewise be used as an absorbent material. It is particularly effective as an absorbent and one pound thereof will take up as much as ten pounds of carbon bisulfide without any tendency of the liquid to drain from the absorbent.

Referring to the drawings: In Figure 1 is shown a tin can 5 of conventional design, which is filled with an absorbent material 6 containing carbon bisulfide absorbed therein. If such absorbent as cotton batting, which is of a more or less inflammable nature, is employed it is desirable to place a disc 7 of wire gauze of approximately the same cross-sectional diameter as the interior of the tin can thereupon. This gauze prevents the flame from striking down into the absorbent material and thus igniting the latter. However, the carbon bisulfide is not prevented from burning in a clear, smokeless flame above the wire gauze.

It will, of course, be apparent that any convenient lid (not shown) may be employed for covering the can and preventing evaporation losses and fire hazards.

By thus employing carbon bisulfide absorbed in such suitable medium as kieselguhr or cotton batting, as a source of supply for sulfur dioxide, the formation of films of sublimed sulfur upon the articles being fumigated is obviated. Also, fire hazards attending the use of elemental sulfur are materially reduced because it is found that the evaporation of carbon bisulfide is so rapid that the cooling action thus set up effectively prevents any heating of the containers for the material.

Figure 2:
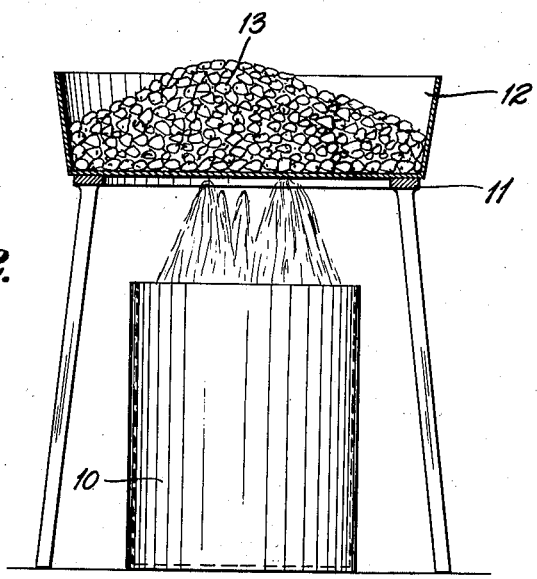
Figure 2 is a view, partly in elevation and partly in cross-section, of an apparatus for simultaneously burning carbon bisulfide and gasifying solid carbon dioxide.

However, the risk due to the corrosive action of sulfur dioxide upon delicate fabrics or lacquered surfaces or other sensitive materials is not completely eliminated. The applicant now finds that this latter objectionable feature of sulfur dioxide may be obviated by effecting the fumigation in the presence of carbon dioxide. Any convenient source of supply of carbon dioxide may be employed but it is most readily obtained in the dry form by the evaporation of liquid or solid carbon dioxide. The use of this material in combination with carbon bisulfide absorbed in such suitable medium as kieselguhr or cotton batting already described, is illustrated in Figure 2 of the drawings. In this figure a tin can 10, containing carbon bisulfide in the absorbent medium, is ignited and placed under a conventional support, e. g. an ordinary ring stand 11. A very shallow pan or tray 12 is placed upon this stand and is charged with a suitable quantity of liquid or preferably solid carbon dioxide 13. The ordinary commercial variety of solid carbon dioxide known as "dry ice" may be employed for this purpose. Since a considerable bulk of this material is required it is preferable to place a cover (not shown) of wire gauze or similar foraminous material thereupon for purposes of preventing it from falling over the edges of the container. Shallow containers of this character are especially desirable because the ready escape of the carbon dioxide as it is gasified is facilitated.

The form of the invention illustrated in Figures 3 and 4 of the drawings comprises a stand composed of sheet metal or some similar convenient material, having an intermediate portion 15 which supports "dry ice" (frozen carbon dioxide) 16, and an end portion 17 bent downwardly thereupon to provide legs upon which the device is supported. The intermediate portion is also provided with lateral flanges 18 which serve to confine the "dry ice" and prevents its loss over the sides. In case a large amount of the "dry ice" is being employed it is sometimes convenient to dispose a cover 19 of wire gauze or similar foraminous material upon the device in order further to insure the retention of the material upon the intermediate portion. It will also be apparent that the gauze may be provided with downwardly bent end portions (not shown) to prevent any possible loss of material over the ends of the portion 15. A wire gauze may be placed beneath the "dry ice" to provide a roughened surface that will prevent crawling of the material due to crepitation. The gauze may also have upwardly turned side and end edges to form retaining walls. The portions 17 should be of sufficient length to admit of the disposal of container 20 for carbon bisulfide directly beneath the portion 15. It will, of course, be understood that this container is of the same design and construction as containers 5 and 10 previously described and should be filled with carbon bisulfide absorbed in a suitable porous material.

This construction possesses certain advantages over that employed in Figure 2 of the drawings because the open unobstructed spaces at the ends of the intermediate portion admit of the ready flow of gasified carbon dioxide outwardly and downwardly into the room and at the same time the downwardly bent flanges constituting legs 17 tend to prevent flow of carbon dioxide backwardly and about the container 20. The possibility of extinguishing the flame from the burning carbon bisulfide is thus obviated. The construction is also exceedingly simple and economical to construct.

By thus associating the carbon dioxide and the burning carbon bisulfide, the evaporation of the carbon dioxide is greatly facilitated thereby assuring that all of it will be in gaseous form at the completion of the combustion of the carbon bisulfide. At the same time the gas is more or less warmed by the heat from the carbon bisulfide, thus assisting in the convection thereof to the various parts of the room or chamber in which the gases are being released. Simultaneously, gases from the burning carbon bisulfide are cooled and the danger of scorching delicate materials which are over or near thereto is reduced. In other words, the corrosive action of the $SO_2$ gas is essentially obviated as a result of its being materially cooled and diluted by intermixture with the $CO_2$ gas.

In general, it will be found that carbon bisulfide in an amount sufficient to generate approximately two and one-half pounds of sulfur dioxide per thousand cubic feet of space to be fumigated is effective in exterminating such insects as carpet beetles, moths, bed bugs, etc. Approximately six to ten pounds of carbon dioxide should be employed with this amount of carbon bisulfide. These proportions, of course, are only given by way of example and various modifications may be made therein. It is quite possible to operate with somewhat smaller proportions of gases and it is also possible to increase the amount of carbon bisulfide to the equivalent of three or four pounds of sulfur dioxide for each thousand cubic feet of room space.

The process, as thus described, is highly desirable from a commercial viewpoint because the ingredients employed in conducting it are relatively inexpensive and the apparatus is equally inexpensive and quite simple in character. There is practically no danger of poison to higher forms of life attending the use of the material because the presence of sulfur dioxide is always easily detected. Sulfur dioxide generated in this manner is also much easier to eliminate from the space in which it is generated by ventilation than sulfur dioxide generated in the conventional manner by burning sulfur in elemental form. As previously stated, carbon bisulfide does not give deposits of elemental sulfur upon the exposed surfaces of the articles which are subjected to treatment. Fire and explosion hazards are practically negligible and this constitutes an important advantage. Also, the containers which may be employed are inexpensive and they effectively preserve the carbon bisulfide over long periods of time without appreciable loss due to evaporation. The combination of sulfur dioxide is especially advantageous because by its use all danger of damage to fabrics and delicate surfaces due to corrosion or chemical action is practically eliminated.

Although I have shown and described only the preferred forms of the invention it will be apparent that these forms of the invention are given merely by way of illustration and that numerous modifications may be made therein without departure from the spirit or the scope of the invention or of the appended claims. In this connection it is to be understood that in the hereunto appended claims the expression "supercooled $CO_2$" is intended to embrace the gas in either its liquefied or solid state as a generic expression.

What I claim is:

1. The method which comprises burning $CS_2$ in such close proximity to supercooled $CO_2$ that the heat of the resultant exothermic production of $SO_2$ will serve to vaporize the said supercooled $CO_2$ and mix therewith, thereby producing an essentially non-corrosive fumigating mixture of $SO_2$ and $CO_2$.

2. The method which comprises burning $CS_2$ in such close proximity to supercooled $CO_2$ that the heat of the resultant exothermic production of $SO_2$ will serve to vaporize the said supercooled $CO_2$ and mix therewith, the proportion of $CO_2$ to $SO_2$ being between 2.4 and 4, thereby producing an essentially non-corrosive fumigating mixture of $SO_2$ and $CO_2$.

3. The method which comprises burning $CS_2$ below a surface upon which is supported solid $CO_2$, whereby the heat of combustion of the $CS_2$ will convert the $CO_2$ into its gaseous state and an essentially non-corrosive fumigating mixture of $SO_2$ and $CO_2$ will be obtained.

4. The method which comprises burning $CS_2$ impregnated in an absorbent material below a surface upon which is supported solid $CO_2$, whereby the heat of combustion of the $CS_2$ will convert the $CO_2$ into its gaseous state and an essentially non-corrosive mixture of $CO_2$ and $SO_2$ is obtained, the proportion of $CO_2$ to $SO_2$ being between 2.4 and 4.

GEORGE L. HOCKENYOS.